United States Patent
Yang et al.

(10) Patent No.: US 10,078,509 B2
(45) Date of Patent: Sep. 18, 2018

(54) METHOD AND SYSTEM FOR PROCESSING LIFELONG LEARNING OF TERMINAL AND APPARATUS

(71) Applicant: Huawei Technologies Co., Ltd., Shenzhen (CN)

(72) Inventors: Qiang Yang, Shenzhen (CN); Yangqiu Song, Morgantown, WV (US); Xiuqiang He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 15/181,664

(22) Filed: Jun. 14, 2016

(65) Prior Publication Data

US 2016/0299755 A1    Oct. 13, 2016

Related U.S. Application Data

(63) Continuation of application No. PCT/CN2014/082698, filed on Jul. 22, 2014.

(30) Foreign Application Priority Data

Dec. 18, 2013 (CN) .......................... 2013 1 0699881

(51) Int. Cl.
    *G06F 9/44*    (2018.01)
    *G06F 9/445*   (2018.01)
    (Continued)

(52) U.S. Cl.
    CPC .................. *G06F 8/65* (2013.01); *H04B 1/38* (2013.01); *H04L 67/00* (2013.01); *H04L 67/10* (2013.01); *H04L 67/34* (2013.01)

(58) Field of Classification Search
    CPC .......... G06F 11/3664; G06F 8/65; G06F 8/30; G06F 11/3692; G06F 11/3612;
    (Continued)

(56) References Cited

U.S. PATENT DOCUMENTS 8,311,960 B1    11/2012  Ginzburg et al.
8,555,273 B1 *  10/2013  Chia ..................... G06F 8/654
                                                         717/173
(Continued)

FOREIGN PATENT DOCUMENTS

CN    101616018 A    12/2009
CN    101656949 A     2/2010
(Continued)

OTHER PUBLICATIONS

Foutse Khomh et al.; Do Faster Releases Improve Software Quality An Empirical Case Study of Mozilla Firefox; IEEE; pp. 179-188; <https://dl.acm.org/citation.cfm?id=2664475> (Year: 2012).*

(Continued)

*Primary Examiner* — Thuy Dao
*Assistant Examiner* — Cuong V Luu
(74) *Attorney, Agent, or Firm* — Conley Rose, P.C.

(57) ABSTRACT

A method and a system for processing lifelong learning of a terminal, and an apparatus is presented. The method for processing lifelong learning of a terminal according to the present disclosure includes sending, to a server, a request for downloading a function module, where the download request includes description information of the function module; receiving the function module that is sent by the server and is corresponding to the description information; and using the function module to expand and/or update a local function. According to the embodiments of the present disclosure, the lifelong learning of the terminal is implemented, and a problem in the prior art that the terminal cannot perform function expansion and updating is resolved.

6 Claims, 4 Drawing Sheets

(51) Int. Cl.
*G06F 9/45* (2006.01)
*G06F 8/65* (2018.01)
*H04L 29/08* (2006.01)
*H04B 1/38* (2015.01)

(58) Field of Classification Search
CPC ........ G06F 21/316; G06F 8/61; G06F 21/629; G06F 8/60
See application file for complete search history.

(56) References Cited

U.S. PATENT DOCUMENTS

| | | | | |
|---|---|---|---|---|
| 9,003,387 | B2* | 4/2015 | Van Camp | G06F 8/65 717/170 |
| 9,003,388 | B2* | 4/2015 | Han | G06F 8/65 717/168 |
| 9,208,063 | B1* | 12/2015 | Sisinni | G06F 11/368 |
| 9,710,247 | B2* | 7/2017 | Conlan | G06F 8/65 |
| 2003/0171907 | A1* | 9/2003 | Gal-On | G06F 17/5022 703/14 |
| 2008/0148248 | A1* | 6/2008 | Volkmer | G06F 8/65 717/168 |
| 2008/0288255 | A1 | 11/2008 | Carin et al. | |
| 2012/0144384 | A1* | 6/2012 | Baek | G06F 11/3013 717/173 |
| 2013/0231258 | A1 | 9/2013 | Wilde et al. | |
| 2013/0346965 | A1* | 12/2013 | Conlan | G06F 8/61 717/178 |
| 2014/0282464 | A1* | 9/2014 | El-Gillani | G06F 8/61 717/168 |
| 2016/0162275 | A1* | 6/2016 | Morley | G06F 8/65 717/170 |

FOREIGN PATENT DOCUMENTS

| | | |
|---|---|---|
| CN | 102236563 A | 11/2011 |
| CN | 102857555 A | 1/2013 |
| CN | 102932441 A | 2/2013 |
| CN | 103067509 A | 4/2013 |
| EP | 1239366 A1 | 9/2002 |
| EP | 1484716 A1 | 12/2004 |
| KR | 20080037450 A | 4/2008 |

OTHER PUBLICATIONS

Alan P. Wood; Software Reliability from the Customer View; IEEE; pp. 37-42; <https://ieeexplore.ieee.org/stamp/stamp.jsp?tp=&arnumber=1220580> (Year: 2003).*
Luis Moura Silva et al.; Using Virtualization to Improve Software Rejuvenation; IEEE; pp. 1525-1538; <https://ieeexplore.ieee.org/stamp/stamp.jsp?tp=&arnumber=5184821> (Year: 2009).*
Alexander Tarvo; Mining Software History to Improve Software Maintenance Quality A Case Study; IEEE; pp. 34-40; <https://ieeexplore.ieee.org/stamp/stamp.jsp?tp=&arnumber=4721181> (Year: 2009).*
Walid Maalej et al.; Bug Report, Feature Request, or Simply Praise On Automatically Classifying App Reviews; IEEE; pp. 116-125; <https://ieeexplore.ieee.org/stamp/stamp.jsp?tp=&arnumber=7320414> (Year: 2015).*
Jose M. Conejero et al.; Analysis of Crosscutting Features in Software Product Lines; ACM; pp. 3-9; <https://dl.acm.org/citation.cfm?id=1370831> (Year: 2008).*
Partial English Translation and Abstract of Chinese Patent Application No. CN102932441, dated Jun. 7, 2016, 9 pages.
Partial English Translation and Abstract of Chinese Patent Application No. CN103067509, dated Jun. 7, 2016, 4 pages.
Foreign Communication From A Counterpart Application, PCT Application No. PCT/CN2014/082698, English Translation of International Search Report dated Oct. 27, 2014, 2 pages.
Foreign Communication From A Counterpart Application, PCT Application No. PCT/CN2014/082698, English Translation of Written Opinion dated Oct. 27, 2014, 6 pages.
Machine Translation and Abstract of Chinese Publication No. CN102857555, Jan. 2, 2013, 11 pages.
Foreign Communication From A Counterpart Application, Chinese Application No. 20131069981.6, Chinese Office Action dated Jun. 16, 2017, 7 pages.

* cited by examiner

METHOD AND SYSTEM FOR PROCESSING LIFELONG LEARNING OF TERMINAL AND APPARATUS

CROSS-REFERENCE TO RELATED APPLICATIONS

This application is a continuation of International Application No. PCT/CN2014/082698, filed on Jul. 22, 2014, which claims priority to Chinese Patent Application No. 201310699881.6, filed on Dec. 18, 2013, both of which are hereby incorporated by reference in their entireties.

TECHNICAL FIELD

Embodiments of the present disclosure relate to the technical field of computer science, and in particular, to a method and a system for processing lifelong learning of a terminal, and an apparatus.

BACKGROUND

With rapid development of science and technology, an intelligent terminal emerges accordingly. The intelligent terminal has an independent operating system and independent operating space. Therefore, the intelligent terminal has a function of intelligently analyzing and processing a problem. For example, the intelligent terminal may intelligently analyze a usage scenario of a user according to a configuration currently used by the user, and may also intelligently analyze a usage preference of the user of the intelligent terminal.

At present, when an intelligent terminal in the market is delivered, a corresponding system is migrated to an operating system of the intelligent terminal by a manufacturer. Therefore, a corresponding function of the intelligent terminal is restricted and unchangeable, and the corresponding function of the intelligent terminal is the same for all users.

Therefore, in the prior art, an intelligent terminal cannot perform function expansion and updating.

SUMMARY

Embodiments of the present disclosure provide a method and a system for processing lifelong learning of a terminal, and an apparatus, so as to resolve a problem in the prior art that an intelligent terminal cannot perform function expansion and updating.

A first aspect of the present disclosure provides a method for processing lifelong learning of a terminal, including sending, to a server, a request for downloading a function module, where the download request includes description information of the function module; receiving the function module that is sent by the server and is corresponding to the description information; and using the function module to expand and/or update a local function.

In a first possible implementation manner of the first aspect, before the sending, to a server, a request for downloading a function module, the method further includes sending a retrieval query request to the server after a task is created, where the retrieval query request includes task requirement information; and receiving a retrieval result sent by the server, where the retrieval result includes the description information that is of the function module and is corresponding to the task requirement information; and after the using the function module to expand and/or update a local function, the method further includes using an expanded and/or updated local function to process the task.

With reference to the first possible implementation manner of the first aspect, in a second possible implementation manner of the first aspect, after the using an expanded and/or updated local function to process the task, the method further includes feeding back operating data obtained after the task processing to the server, so that the server updates the function module according to the task and the operating data corresponding to the task.

A second aspect of the present disclosure provides a method for processing lifelong learning of a terminal, including receiving a request that is sent by the terminal and for downloading a function module, where the download request includes description information of the function module; and sending the function module corresponding to the description information to the terminal, so that the terminal uses the function module to expand and/or update a local function.

In a first possible implementation manner of the second aspect, before the receiving a request that is sent by the terminal and for downloading a function module, the method further includes creating the function module according to a task and operating data corresponding to the task; and storing a correspondence between the function module and the description information of the function module.

With reference to the first possible implementation manner of the second aspect, in a second possible implementation manner of the second aspect, after the storing a correspondence between the function module and the description information of the function module, the method further includes receiving the task and the operating data corresponding to the task that are sent by the terminal; and updating the function module according to the task and the operating data.

With reference to any one of the second aspect to the second possible implementation manner of the second aspect, in a third possible implementation manner of the second aspect, before the receiving a request that is sent by the terminal and for downloading a function module, the method further includes receiving a retrieval query request sent by the terminal, where the retrieval query request includes task requirement information; and sending a retrieval result to the terminal, where the retrieval result includes the description information that is of the function module and is corresponding to the task requirement information.

A third aspect of the present disclosure provides a terminal device, including a sending unit configured to send, to a server, a request for downloading a function module, where the download request includes description information of the function module; a receiving unit configured to receive the function module that is sent by the server and is corresponding to the description information; and a local updating unit configured to use the function module to expand and/or update a local function.

In a first possible implementation manner of the third aspect, the terminal device further includes a retrieval query unit configured to, before the sending unit sends, to the server, the request for downloading the function module, send a retrieval query request to the server after a task is created, where the retrieval query request includes task requirement information; and receive a retrieval result sent by the server, where the retrieval result includes the description information that is of the function module and is corresponding to the task requirement information; and a processing unit configured to, after the local updating unit uses the function module to expand and/or update the local function, use an expanded and/or updated local function to process the task.

With reference to the first possible implementation manner of the third aspect, in a second possible implementation manner of the third aspect, the terminal device further includes a feedback unit configured to, after the processing unit uses the expanded and/or updated local function to process the task, feedback operating data obtained after the task processing to the server, so that the server updates the function module according to the task and the operating data corresponding to the task.

A fourth aspect of the present disclosure provides a server, including a receiving unit configured to receive a request that is sent by a terminal and for downloading a function module, where the download request includes description information of the function module; and a sending unit configured to send the function module corresponding to the description information to the terminal, so that the terminal uses the function module to expand and/or update a local function.

In a first possible implementation manner of the fourth aspect, the server further includes a creating unit configured to, before the receiving unit receives the request that is sent by the terminal and for downloading the function module, create the function module according to a task and operating data corresponding to the task; and a storage unit configured to, before the receiving unit receives the request that is sent by the terminal and for downloading the function module, store a correspondence between the function module and the description information of the function module.

With reference to the first possible implementation manner of the fourth aspect, in a second possible implementation manner of the fourth aspect, the server further includes an updating unit configured to, after the storage unit stores the correspondence between the function module and the description information of the function module, receive the task and the operating data corresponding to the task that are sent by the terminal; and update the function module according to the task and the operating data.

With reference to any one of the fourth aspect to the second possible implementation manner of the fourth aspect, in a third possible implementation manner of the fourth aspect, the server further includes a retrieval processing unit configured to, before the receiving unit receives the request that is sent by the terminal and for downloading the function module, receive a retrieval query request sent by the terminal, where the retrieval query request includes task requirement information; and send a retrieval result to the terminal, where the retrieval result includes the description information that is of the function module and is corresponding to the task requirement information.

A fifth aspect of the present disclosure provides a system for processing lifelong learning of a terminal, including the terminal device according to any one of the third aspect to the second possible implementation manner of the third aspect and the server according to any one of the fourth aspect to the third possible implementation manner of the fourth aspect.

According to the method and system for processing lifelong learning of a terminal, and the apparatus in the embodiments of the present disclosure, a terminal downloads a function module that is continuously updated by a server according to a task and operating data corresponding to the task, and uses the function module to expand and/or update a local function, which resolves a problem in the prior art that the terminal cannot perform function expansion and updating, and implements that the terminal has a capability of lifelong learning.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
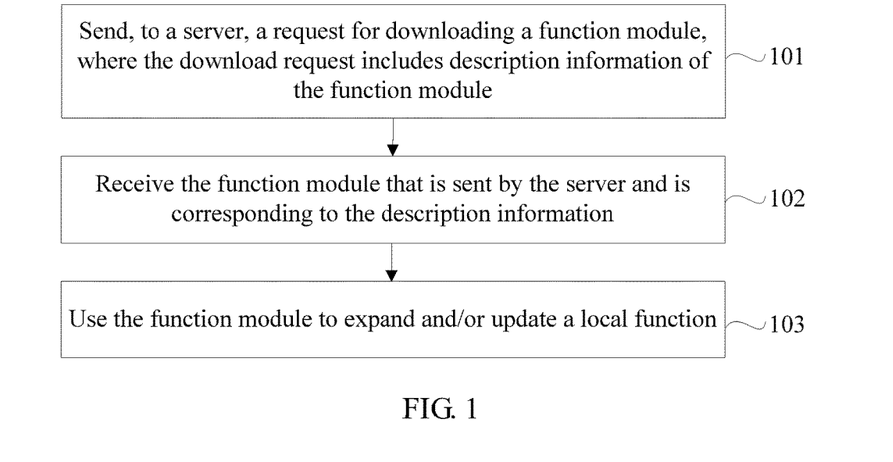
FIG. 1 is a flowchart of Embodiment 1 of a method for processing lifelong learning of a terminal according to the present disclosure.

FIG. 1 is a flowchart of Embodiment 1 of a method for processing lifelong learning of a terminal according to the present disclosure. As shown in FIG. 1, the method in this embodiment may include the following steps:

Step 101: Send, to a server, a request for downloading a function module, where the download request includes description information of the function module.

Step 102: Receive the function module that is sent by the server and is corresponding to the description information.

Step 103: Use the function module to expand and/or update a local function.

When the terminal has a new function requirement, the terminal may send, according to the function requirement of the terminal, a request that includes description information of a corresponding function module to the server, so as to request to download the function module. Alternatively, the terminal may be set to periodically send a download request that includes description information of a corresponding function module to the server. The description information of the function module may be information that is used to describe the function module, such as a name of the function module and a type of the function module. The terminal receives the function module that is sent by the server and is corresponding to the description information, and uses the downloaded function module to expand a local function or update an existing local function module, so that the terminal has a capability of lifelong learning, such as user behavior analysis and image recognition. In addition to acquiring an updated function module from a server side, the terminal may further independently update the function module according to data collected by the terminal, so as to improve intelligence of the terminal.

Further, before the sending, to a server, a request for downloading a function module, the method further includes sending a retrieval query request to the server after a task is created, where the retrieval query request includes task requirement information; and receiving a retrieval result sent by the server, where the retrieval result includes the description information that is of the function module and is corresponding to the task requirement information; and after the using the function module to expand and/or update a local function, the method further includes using an expanded and/or updated local function to process the task.

After a task is created according to a function requirement, to query a function module related to the function requirement of the terminal, the terminal may send a retrieval query request to the server to determine whether the server has the corresponding function module; if yes, the terminal may further acquire description information of the function module from a retrieval result that is fed back by the server, where the description information is used by the terminal to send, to the server, a request for downloading the function module. After downloading the function module, the terminal uses the function module to complete expansion and/or updating of a local function, and uses an expanded and/or updated local function to process the task. For example, a smartphone does not have a personalized recommendation function that matches a user of the smartphone, or a personalized recommendation function module in the smartphone needs to be updated; the smartphone may send a keyword "recommendation" to a server to perform retrieving and querying, so as to retrieve and query a function module related to recommendation; the smartphone receives a retrieval result sent by the server, where the retrieval result includes a name and a corresponding type of such a function module. The terminal downloads the function module locally and uses the function module to implement a function of recommending a movie, a book, music, or the like to the user of the smartphone.

Further, after the using an expanded and/or updated local function to process the task, the method further includes feeding back operating data obtained after the task processing to the server, so that the server updates the function module according to the task and the operating data corresponding to the task.

The terminal uses the expanded and/or updated local function to process the task; in a process of processing the task, the terminal needs to provide the operating data of the function module accordingly; the terminal may upload the operating data to the server after processing the task, so that the server updates the function module according to the task and the operating data corresponding to the task. The function module that is updated using the operating data uploaded by the terminal to the server is more pertinent to the terminal.

In this embodiment, a terminal sends, to a server, a retrieval query request and a request for downloading a function module, and uses the downloaded function module to expand and/or update a local function; in addition, the function module on a server side may further be updated using operating data that is obtained after task processing and uploaded by the terminal to the server, which resolves a problem in the prior art that the terminal cannot perform function expansion and/or updating, and implements that the terminal has a capability of lifelong learning.

Figure 2:
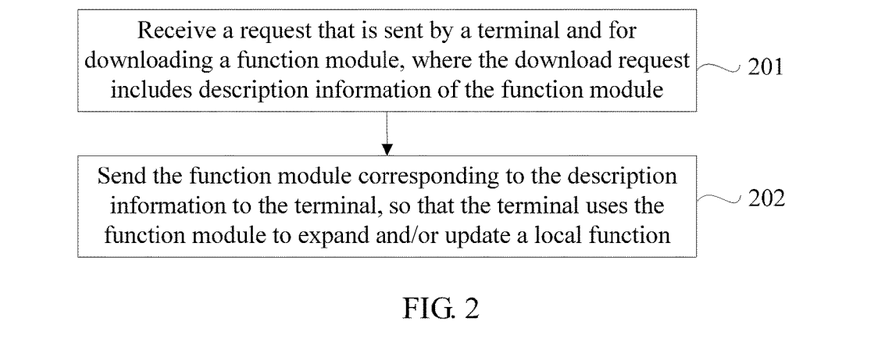
FIG. 2 is a flowchart of Embodiment 2 of a method for processing lifelong learning of a terminal according to the present disclosure.

FIG. 2 is a flowchart of Embodiment 2 of a method for processing lifelong learning of a terminal according to the present disclosure. As shown in FIG. 2, the method in this embodiment may include the following steps:

Step 201: Receive a request that is sent by the terminal and for downloading a function module, where the download request includes description information of the function module.

Step 202: Send the function module corresponding to the description information to the terminal, so that the terminal uses the function module to expand and/or update a local function.

A server sends the function module corresponding to the description information to the terminal according to the description information, of the function module, included in the request that is sent by the terminal and for downloading the function module, so that the terminal expands and/or updates the local function.

Further, before the receiving a request that is sent by the terminal and for downloading a function module, the method further includes creating the function module according to a task and operating data corresponding to the task; and storing a correspondence between the function module and the description information of the function module.

The server needs to create the function module according to the task and the operating data corresponding to the task, where the function module is an initial function module. The initial function module may be created using a lifelong learning algorithm, such as classification, clustering, regression, and a rule. A type of the function module may be determined according to the task, which is correspondingly to establish an entire model, a group model, an individual model, or the like. The function module obtained by means of learning is stored in a function module library using an index. The index corresponds to the description information of the function module. To store and retrieve large number of function modules, data structures of different types of function modules need to be analyzed, so as to separately index the function modules effectively. For example, a dense vector, a sparse vector, and a tree-like classifier need different indexing mechanisms, so that retrieval is performed according to an id, a group, and a similarity. Storage of the function module used in this embodiment relates to storage and retrieval of a large scale of dense vectors, sparse vectors, trees, and pictures. The dense vectors relate to a method such as KDTree, ConeTree, and BBTree; the sparse vectors relate to a method such as an inverted table, PPJoin, and Spilltree. For a function module in a form of a tree, the tree may be converted into a rule, and then a character string is used to match the rule; or the tree may be regarded as a simple picture, and then matching is directly performed on the picture. The function module corresponds to a result model obtained after statistics collecting and lifelong learning by a server side, and is used by a client to complete a function such as intelligent prediction.

It should be noted that this embodiment sets no limitation on specific implementation of function module creation and storage.

Further, after the storing a correspondence between the function module and the description information of the function module, the method further includes receiving the task and the operating data corresponding to the task that are sent by the terminal; and updating the function module according to the task and the operating data.

The server may update the function module according to the task and the operating data corresponding to the task that are sent by the terminal; for the same task, the data may increase in batches as time passes, or may be fed back by the terminal to the server once and for all. An update algorithm of the function module is obtained by means of statistics collecting and lifelong learning. For example, updating of a function module corresponding to a same task may be completed by means of online learning; updating of function modules corresponding to different tasks may be completed by means of transfer learning. Mechanisms that include multi-task learning, lifelong learning, and the like may also be used to complete updating of a function module. Statistics collecting and lifelong learning may include related statistics collecting and a lifelong learning algorithm, for example, k-means, svm, Naive Bayes, and a decision tree. Methods related to transfer learning may include methods such as multi-task-based learning and TrAdaboost. Lifelong learning may include deep learning, an ELLA algorithm, and the like. The function module is increasingly accurate and intelligent after being updated using a lifelong learning mechanism. It should be noted that this embodiment sets no limitation on specific implementation of function module updating.

Further, before the receiving a request that is sent by the terminal and for downloading a function module, the method further includes receiving a retrieval query request sent by the terminal, where the retrieval query request includes task requirement information; and sending a retrieval result to the terminal, where the retrieval result includes the description information that is of the function module and is corresponding to the task requirement information.

The server receives the retrieval query request sent by the terminal, and sends, to the terminal, the description information that is of the function module and is corresponding to the task requirement information retrieved by the terminal. The description information of the function module may be information that is used to describe the function module, such as a name of the function module and a type of the function module.

In this embodiment, a server creates a function module according to a task and operating data corresponding to the task, stores the function module in a function module library, updates the function module according to the task and the operating data corresponding to the task, receives a retrieval query request and a download request that are sent by a terminal, and sends a corresponding function module to the terminal, so that the terminal uses the function module to expand and/or update a local function, which implements that the terminal has a capability of lifelong learning, and resolves a problem in the prior art that the terminal cannot perform function expansion and/or updating.

Figure 3:
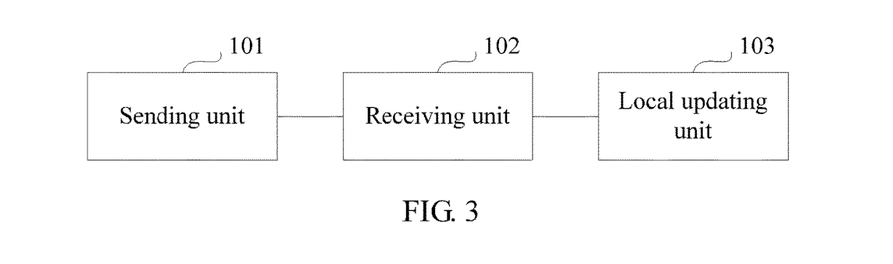
FIG. 3 is a schematic structural diagram of Embodiment 1 of a terminal device according to the present disclosure.

FIG. 3 is a schematic structural diagram of Embodiment 1 of a terminal device according to the present disclosure. As shown in FIG. 3, the terminal device in this embodiment may include a sending unit 101 configured to send, to a server, a request for downloading a function module, where the download request includes description information of the function module; a receiving unit 102 configured to receive the function module that is sent by the server and is corresponding to the description information; and a local updating unit 103 configured to use the function module to expand and/or update a local function.

The terminal device in this embodiment may be configured to implement the technical solution in the method embodiment shown in FIG. 1, and implementation principles and technical effects of the terminal device are similar and are not described herein again.

Figure 4:
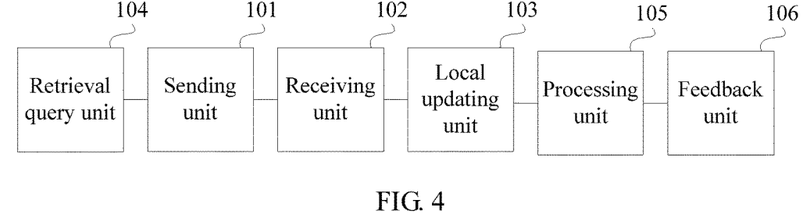
FIG. 4 is a schematic structural diagram of Embodiment 2 of a terminal device according to the present disclosure.

FIG. 4 is a schematic structural diagram of Embodiment 2 of a terminal device according to the present disclosure. As shown in FIG. 4, based on the apparatus structure shown in FIG. 3, the terminal device in this embodiment may further include a retrieval query unit 104 configured to, before the sending unit sends, to the server, the request for downloading the function module, send a retrieval query request to the server after a task is created, where the retrieval query request includes task requirement information; and receive a retrieval result sent by the server, where the retrieval result includes the description information that is of the function module and is corresponding to the task requirement information; a processing unit 105 configured to, after the local updating unit uses the function module to expand and/or update the local function, use an expanded and/or updated local function to process the task; and a feedback unit 106 configured to, after the processing unit uses the expanded and/or updated local function to process the task, feedback operating data obtained after the task processing to the server, so that the server updates the function module according to the task and the operating data corresponding to the task.

The terminal device in this embodiment may be configured to implement the technical solution in the method embodiment shown in FIG. 1, and implementation principles and technical effects of the terminal device are similar and are not described herein again.

Figure 5:
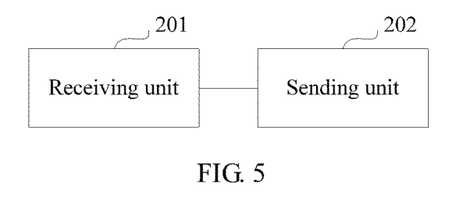
FIG. 5 is a schematic structural diagram of Embodiment 1 of a server according to the present disclosure.

FIG. 5 is a schematic structural diagram of Embodiment 1 of a server according to the present disclosure. As shown in FIG. 5, the server in this embodiment may include a receiving unit 201 configured to receive a request that is sent by a terminal and for downloading a function module, where the download request includes description information of the function module; and a sending unit 202 configured to send the function module corresponding to the description information to the terminal, so that the terminal uses the function module to expand and/or update a local function.

The server in this embodiment may be configured to implement the technical solution in the method embodiment shown in FIG. 2, and implementation principles and technical effects of the server are similar and are not described herein again.

Figure 6:
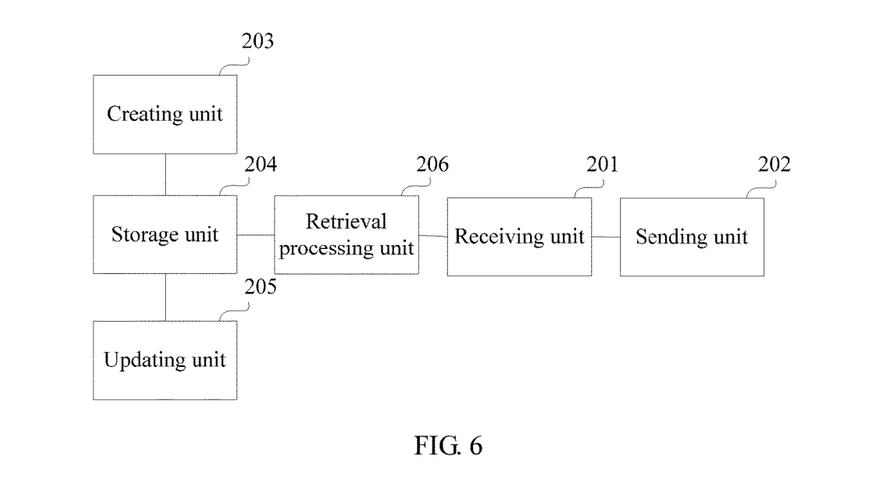
FIG. 6 is a schematic structural diagram of Embodiment 2 of a server according to the present disclosure.

FIG. 6 is a schematic structural diagram of Embodiment 2 of a server according to the present disclosure. As shown in FIG. 6, based on the apparatus structure shown in FIG. 5, the server in this embodiment may further include a creating unit 203 configured to, before the receiving unit receives the request that is sent by the terminal and for downloading the function module, create the function module according to a task and operating data corresponding to the task; a storage unit 204 configured to, before the receiving unit receives the request that is sent by the terminal and for downloading the function module, store a correspondence between the function module and the description information of the function module; an updating unit 205 configured to, after the storage unit stores the correspondence between the function module and the description information of the function module, receive the task and the operating data corresponding to the task that are sent by the terminal; and update the function module according to the task and the operating data; and a retrieval processing unit 206 configured to, before the receiving unit receives the request that is sent by the terminal and for downloading the function module, receive a retrieval query request sent by the terminal, where the retrieval query request includes task requirement information; and send a retrieval result to the terminal, where the retrieval result includes the description information that is of the function module and is corresponding to the task requirement information.

The server in this embodiment may be configured to implement the technical solution in the method embodiment shown in FIG. 2, and implementation principles and technical effects of the server are similar and are not described herein again.

Figure 7:
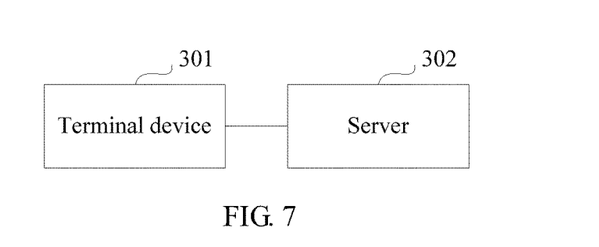
FIG. 7 is a schematic structural diagram of an embodiment of a system for processing lifelong learning of a terminal according to the present disclosure.

FIG. 7 is a schematic structural diagram of an embodiment of a system for processing lifelong learning of a terminal according to the present disclosure. As shown in FIG. 7, the system for processing lifelong learning of a terminal in this embodiment may include a terminal device 301 and a server 302, where a principle of the terminal device 301 in this embodiment is the same as that of the embodiment of the method for processing lifelong learning of a terminal of the present disclosure shown in FIG. 1 and is not described herein again; a principle of the server in this embodiment is the same as that of the embodiment of the method for processing lifelong learning of a terminal of the present disclosure shown in FIG. 2 and is not described herein again.

Figure 8:
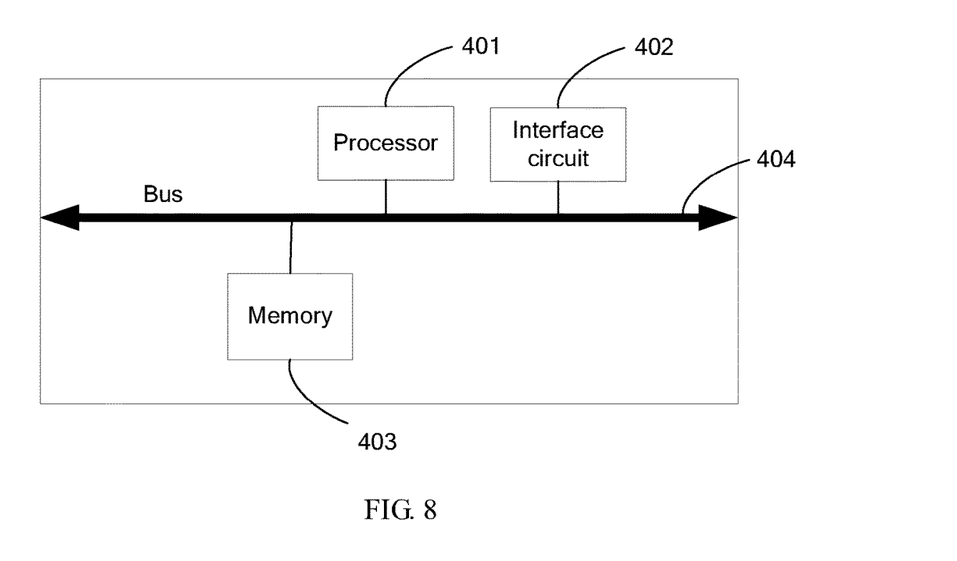
FIG. 8 is a schematic structural diagram of Embodiment 3 of a terminal device according to the present disclosure.

FIG. 8 is a schematic structural diagram of Embodiment 3 of a terminal device according to the present disclosure. As shown in FIG. 8, the terminal device in this embodiment includes a processor 401 and an interface circuit 402. The figure further shows a memory 403 and a bus 404. The processor 401, the interface circuit 402, and the memory 403 are connected and complete mutual communication using the bus 404.

The bus 404 may be an industry standard architecture (ISA) bus, a peripheral component interconnect (PCI) bus, an inter-integrated circuit (I2C) bus, or the like. The bus 404 may be categorized into an address bus, a data bus, a control bus, and the like. For convenience of denotation, the bus is represented using only one thick line in FIG. 4; however, it does not indicate that there is only one bus or only one type of bus.

The memory 403 is configured to store executable program code, where the program code includes a computer operation instruction. The memory 403 may be a volatile memory, for example, a random-access memory (RAM); or may be a non-volatile memory (NVM), for example, a read-only memory (ROM), a flash memory, a hard disk drive (HDD), or a solid-state drive (SSD).

The processor 401 may be a central processing unit (CPU).

The processor 401 may invoke the operation instruction or program code stored in the memory 403 to perform a method for processing lifelong learning of a terminal provided in an embodiment of the present disclosure, where the method includes sending, by the processor 401 to a server, a request for downloading a function module, where the download request includes description information of the function module; receiving, by the processor 401 using the interface circuit 402, the function module that is sent by the server and is corresponding to the description information; using, by the processor 401, the function module to expand and/or update a local function; sending, by the processor 401, a retrieval query request to the server after a task is created, where the retrieval query request includes task requirement information; and receiving, by the processor 401 using the interface circuit 402, a retrieval result sent by the server, where the retrieval result includes the description information that is of the function module and is corresponding to the task requirement information; and after the using, by the processor 401, the function module to expand and/or update a local function, the method further includes using, by the processor 401, an expanded and/or updated local function to process the task; and feeding back, by the processor 401, operating data obtained after the task processing to the server, so that the server updates the function module according to the task and the operating data corresponding to the task.

Figure 9:
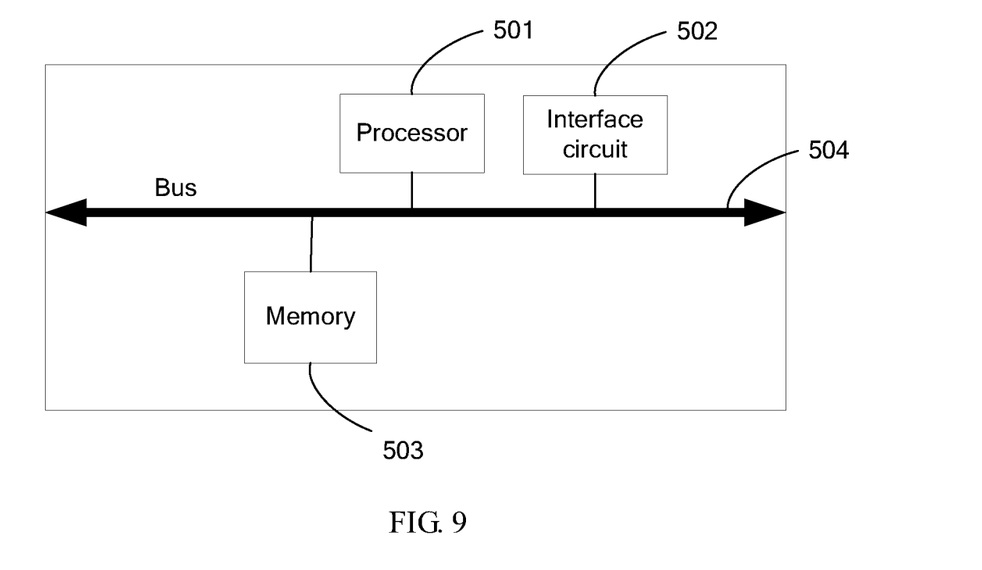
FIG. 9 is a schematic structural diagram of Embodiment 3 of a server according to the present disclosure.

FIG. 9 is a schematic structural diagram of Embodiment 3 of a server according to the present disclosure. As shown in FIG. 9, the server in this embodiment includes a processor 501 and an interface circuit 502. The figure further shows a memory 503 and a bus 504. The processor 501, the interface circuit 502, and the memory 503 are connected and complete mutual communication using the bus 504.

The bus 504 may be an ISA bus, a PCI bus, an I2C bus, or the like. The bus 504 may be categorized into an address bus, a data bus, a control bus, and the like. For convenience of denotation, the bus is represented using only one thick line in FIG. 9; however, it does not indicate that there is only one bus or only one type of bus.

The memory 503 is configured to store executable program code, where the program code includes a computer operation instruction. The memory 503 may be a volatile memory, for example, a RAM; or may be a NVM, for example, a ROM, a flash memory, a HDD, or a SSD.

The processor 501 may be a CPU.

The processor 501 may invoke the operation instruction or program code stored in the memory 503 to perform a method for processing lifelong learning of a terminal provided in an embodiment of the present disclosure, where the method includes receiving, by the processor 501 using the interface circuit 502, a request that is sent by a terminal and for downloading a function module, where the download request includes description information of the function module; sending, by the processor 501, the function module corresponding to the description information to the terminal, so that the terminal uses the function module to expand and/or update a local function; creating, by the processor 501, the function module according to a task and operating data corresponding to the task; storing, by the memory 503, a correspondence between the function module and the description information of the function module; receiving, by the processor 501 using the interface circuit 502, the task and the operating data corresponding to the task that are sent by the terminal; updating, by the processor 501, the function module according to the task and the operating data; receiving, by the processor 501 using the interface circuit 502, a retrieval query request sent by the terminal, where the retrieval query request includes task requirement information; and sending, by the processor 501, a retrieval result to the terminal, where the retrieval result includes the description information that is of the function module and is corresponding to the task requirement information.

Persons of ordinary skill in the art may understand that all or some of the steps of the method embodiments may be implemented by a program instructing relevant hardware. The foregoing program may be stored in a computer-readable storage medium. When the program runs, the steps of the method embodiments are performed. The foregoing storage medium includes any medium that may store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for processing lifelong learning of a terminal, comprising:
   sending, by the terminal to a server, a retrieval query request to the server after a task is created, wherein the retrieval query request comprises task requirement information;
   receiving, by the terminal, a retrieval result from the server, wherein the retrieval result comprises description information of a function module and corresponds to the task requirement information;
   sending, by the terminal to the server, a download request for downloading the function module, wherein the download request comprises the description information of the function module;
   receiving, by the terminal, the function module from the server and corresponding to the description information;
   applying, by the terminal, the function module to at least one of expand or update a local function;
   applying, by the terminal, at least one of an expanded or updated local function to process the task;
   feeding back, by the terminal, operating data obtained after the task processing to the server, such that the server updates the function module according to the task and the operating data corresponding to the task; and
   updating, by the terminal and independently of the server, the function module according to the task and the operating data.

2. A terminal device, comprising:
   a transmitter configured to:
     send a retrieval query request to a server after a task is created, wherein the retrieval query request comprises task requirement information; and
     send a download request for downloading a function module to the server, wherein the download request comprises description information of the function module;
   a receiver configured to:
     receive a retrieval result from the server, wherein the retrieval result comprises the description information of the function module and is corresponding to the task requirement information; and
     receive the function module from the server and corresponds to the description information; and
   a hardware processor coupled to the transmitter and the receiver and configured to:
     use the function module to at least one of expand or update a local function;
     use at least one of an expanded or updated local function to process the task;
     feedback operating data obtained after the task processing to the server after the processor uses the at least one of expanded or updated local function to process the task, such that the server updates the function module according to the task and the operating data corresponding to the task; and
     update, independently of the server, the function module according to the task and the operating data.

3. A system for processing lifelong learning of a terminal, comprising:
   a server; and
   a terminal device comprising:
     a terminal transmitter configured to:
       send a retrieval query request to the server after a task is created, wherein the retrieval query request comprises task requirement information; and
       send, to the server, a download request for downloading a function module, wherein the download request comprises description information of the function module;
     a terminal receiver configured to:
       receive a retrieval result from the server, wherein the retrieval result comprises the description information of the function module and corresponds to the task requirement information; and
       receive the function module from the server and corresponding to the description information; and
     a hardware processor coupled to the terminal transmitter and the terminal receiver and configured to:
       use the function module to at least one of expand or update a local function;
       use at least one of an expanded or updated local function to process the task;
       feedback operating data obtained after the task processing to the server, such that the server updates the function module according to the task and the operating data corresponding to the task; and
       update, independently of the server, the function module according to the task and the operating data,
   wherein the server comprises:
     a server receiver configured to receive the download request from the terminal for downloading the function module; and
     a server transmitter configured to send the function module corresponding to the description information to the terminal.

4. The system according to claim 3, wherein the server further comprises:
   a server processor configured to create the function module according to a task and operating data corresponding to the task before the server receiver receives the download request from the terminal for downloading the function module; and
   a memory configured to store a correspondence between the function module and the description information of the function module before the server receiver receives the download request.

5. The system according to claim 4, wherein the server processor is further configured to:
   receive the task and the operating data corresponding to the from the terminal after the memory stores the correspondence between the function module and the description information of the function module; and update the function module according to the task and the operating data.

6. The system according to claim 5, wherein the server processor is further configured to:

receive the retrieval query request from the terminal before the server receiver receives the download request from the terminal for downloading the function module, wherein the retrieval query request comprises task requirement information; and send the retrieval result to the terminal, wherein the retrieval result comprises the description information of the function module and corresponding to the task requirement information.

* * * * *

UNITED STATES PATENT AND TRADEMARK OFFICE
CERTIFICATE OF CORRECTION

PATENT NO. : 10,078,509 B2
APPLICATION NO. : 15/181664
DATED : September 18, 2018
INVENTOR(S) : Qiang Yang, Yangqiu Song and Xiuqiang He Page 1 of 1

It is certified that error appears in the above-identified patent and that said Letters Patent is hereby corrected as shown below:

On the Title Page

Item (30), Line 1: "201310699881" should read "201310699881.6"

In the Claims

Column 12, Line 66: insert --task-- before "from"

Signed and Sealed this
Thirteenth Day of November, 2018

Andrei Iancu
*Director of the United States Patent and Trademark Office*